United States Patent
Koneti et al.

(10) Patent No.: US 9,342,367 B2
(45) Date of Patent: May 17, 2016

(54) SYSTEM AND METHOD FOR SELECTING CLOUD SERVICES

(75) Inventors: Venkata Ramana Koneti, Hyderabad (IN); Sreedhara Narayanaswamy, Bangalore (IN)

(73) Assignee: Computer Associates Think, Inc., Islandia, NY (US)

( * ) Notice: Subject to any disclaimer, the term of this patent is extended or adjusted under 35 U.S.C. 154(b) by 1209 days.

(21) Appl. No.: 12/816,691

(22) Filed: Jun. 16, 2010

(65) Prior Publication Data

US 2011/0314082 A1    Dec. 22, 2011

(51) Int. Cl.
*G06F 15/16*     (2006.01)
*G06F 9/50*      (2006.01)

(52) U.S. Cl.
CPC .................................. *G06F 9/5055* (2013.01)

(58) Field of Classification Search
USPC ........................................ 709/203, 218, 219
See application file for complete search history.

(56) References Cited

U.S. PATENT DOCUMENTS

| | | | |
|---|---|---|---|
| 2003/0046244 A1* | 3/2003 | Shear et al. | 705/52 |
| 2004/0177917 A1* | 9/2004 | Adachi | 156/230 |
| 2006/0046712 A1* | 3/2006 | Shamp et al. | 455/426.1 |
| 2011/0029352 A1* | 2/2011 | Lau et al. | 705/9 |
| 2011/0138050 A1* | 6/2011 | Dawson et al. | 709/226 |
| 2011/0145094 A1* | 6/2011 | Dawson et al. | 705/26.63 |
| 2011/0216651 A1* | 9/2011 | Bansal et al. | 370/235 |
| 2011/0261828 A1* | 10/2011 | Smith | 370/401 |
| 2011/0282975 A1* | 11/2011 | Carter | 709/220 |

* cited by examiner

*Primary Examiner* — Philip Chea
*Assistant Examiner* — Van Kim T Nguyen
(74) *Attorney, Agent, or Firm* — Gilliam IP PLLC

(57) ABSTRACT

A system and process include receiving information relating to a plurality of cloud services from a plurality of cloud service providers. A determination is made, for each of the plurality of cloud services, one or more of a location of a server that hosts a cloud service, an origin of data used in the cloud service, and a destination of data processed by the cloud service. One or more of the plurality of cloud services are selected based on one or more of the determination of the server location, the origin of data, and the destination of data.

5 Claims, 5 Drawing Sheets

SYSTEM AND METHOD FOR SELECTING CLOUD SERVICES

TECHNICAL FIELD

The current disclosure relates to cloud computing, and in an embodiment, but not by way of limitation, to selecting a particular cloud vendor or cloud service provider based on physical locations of hardware and data.

BACKGROUND

In an Information Technology (IT) environment, where cloud-based system services are consumed through a Cloud Service Broker, it can be important for the enterprises, subscribers, or customers of the cloud services to determine the origin of the services, the origin and destination of data, and finally the storage of data. The destination of the data and the storage of the data may or may not be the same location. For example, the destination may be a client machine, but the long term storage of the data may be a more permanent computer storage device remotely located from the client device. This may be important for a variety of reasons, some of which are political in nature, such as the degree of access that the pertinent government has to the data, and the access that the government permits third parties, or even the subscriber itself, to have to the data.

Consequently, it can be important for a subscriber of cloud services to know the country or countries in which its data will be hosted. This can be important because the location of the data directly affects the choice of the law that will govern the handling of, the access to, and the storage of the data. For example, if the data resides in a particular country, it is likely that the law of that country will govern access to the servers and/or the computer storage media where the data are hosted. If a client demands access to its data, the law of that country may apply and may restrict access to that data. Additionally, the law of that country may permit the government of that country to have unlimited access to the data stored in its territory. By contrast, if the data is stored in another country, there might be stricter restrictions to government access to data stored in that country.

A global company that uses cloud services from a variety of providers (i.e., hybrid cloud usage scenarios) may want to know where the personal data of its employees, clients, and others is, or will be, located. With this knowledge, the company can address the specific restrictions that foreign data protections laws may impose. For example, a particular company may not oppose the use of a cloud service provider in one country, but it might object to the transfer of its data to another country. Knowing where the cloud service provider will host the data is a prerequisite to implementing the required measures to ensure compliance with local laws that restrict the cross border flow of data.

DETAILED DESCRIPTION

In a hybrid cloud usage scenario, it can be important for a subscriber to cloud services to know from where data is coming (the origin) and to know to where data is going (the destination), since access to the data will be governed by the applicable laws of the country in which data resides, to which data flows, in which data is stored, and in which the application is executed. For example, cloud computing subscribers and service providers will need a clear understanding of the complex restrictions and requirements created under the data protection laws of the European Union member states and of several other non-EU countries with similar laws. Cumbersome restrictions could hamper the transfer of data outside of these countries. Their laws require data controllers (who originally collected the data) to inform individuals that their data will be processed abroad and to obtain their consent to the transfer. In addition, the data controller and the recipient of the data may have to enter into special contracts that must be approved by the local data protection authority. As another example, for data that is sent to the United States, the U.S. recipient of the data may self-certify its data protection procedures by registration with the U.S. Department of Commerce. Additional contracts limiting the use or reuse of the data may be required.

Figure 1:
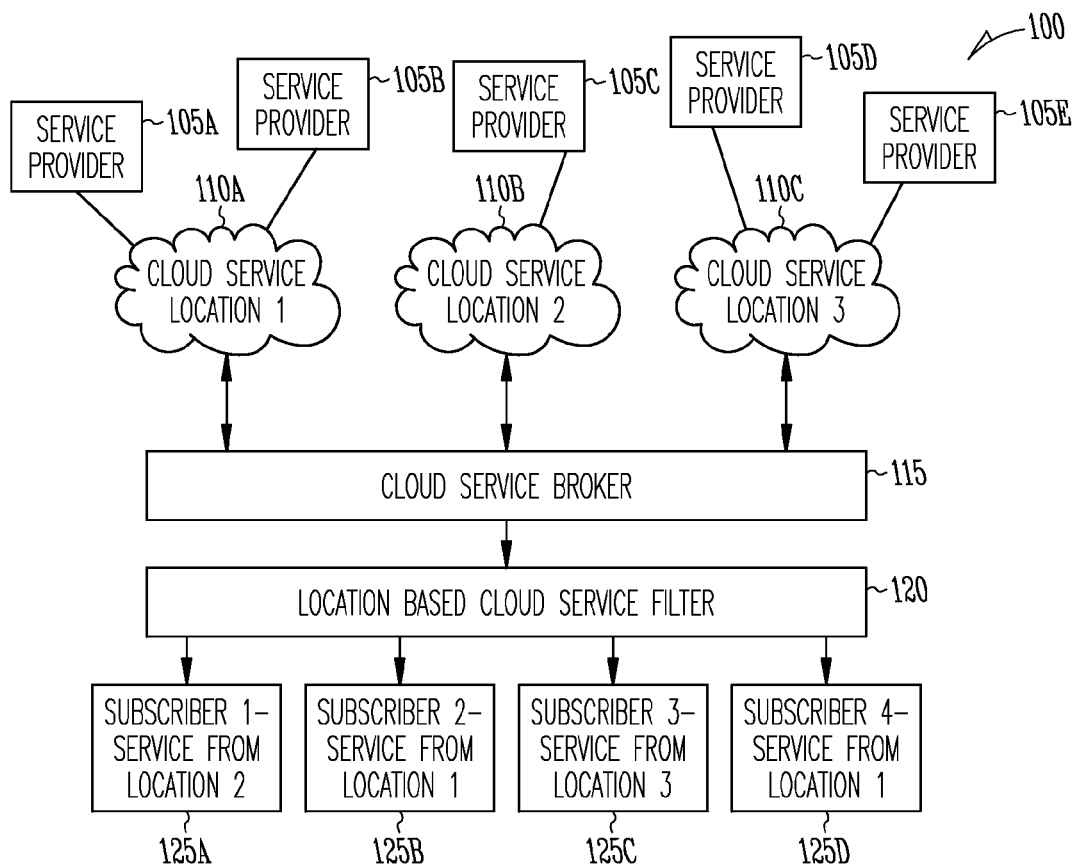
FIG. 1 is a block diagram of an example system for selecting a cloud service provider based on a hosting location of the cloud service provider, an origin of data, a destination of data, and/or a storage location of data.

To address the needs of a consumer of, or a subscriber to, cloud services related to the location transparency of the services it consumes, an embodiment of the present disclosure implements a methodology that can be utilized and offered by a cloud service broker. In this embodiment, a cloud service broker depends on a location-based cloud service filter component. As shown in FIG. 1, a cloud service broker offers services that are hosted from different cloud service vendors or providers. A cloud service consumer subscribes to these services. A subscription to this service provides the consumer with information such as the location of the service (or the location of the servers of the service), the origin of the data, and the destination of the data. This data can include any type of data, such as application data and backup data.

One or more embodiments of this disclosure aim at providing a system and method to consume only those services based out of the cloud that are originated from a specific data center geographic location or are destined to be stored in a specific geographic data location. A cloud service broker can offer this service to its customers to help them make a choice of the cloud vendors based on the geographic location where the data is stored. Also, dynamic monitoring and reporting of the data flow can be provided using embodiments disclosed herein. The service broker can also help their customers to register with an appropriate Data Protection Authority.

FIG. 1 illustrates an example embodiment of a system 100 that provides a means of selecting particular cloud service providers based on origin, destination, and location of servers and data. Referring to FIG. 1, a system 100 may have access to several cloud service providers, such as service providers 105A, 105B, 105C, 105D, and 105E, via cloud vendors 110A, 110B, and 110C. A cloud service broker 115 is in communication with the cloud vendors 110A, 110B, and 110C. The cloud service broker 115 is further in communication with a location-based cloud service filter 120. As will be explained in further detail below, the filter 120 examines the cloud service vendors that are provided by the cloud service broker 115, and filters cloud services 105A, 105B, 105C, 105D, and 105E from different cloud service vendors 110A, 110B, and 110C to different subscribers 125A, 125B, 125C, and 125D.

In an embodiment, the filter 120 determines which cloud service providers 105 to send to which subscribers 125 based on filter parameters provided by the subscribers. For example, a subscriber may not particularly care if a server is located, or if data originates, from a certain country, but the subscriber may care and may not want data that results from his transactions to be stored on computer media located in that country. The filter would then filter the cloud service providers accordingly. In another instance, the subscriber may not want to deal with a service provider if the server is located in a particular country, the data originates from a particular country, or the data is transferred to and stored in that particular country. Once again, the filter 120 would filter the cloud service providers accordingly.

Figure 2:
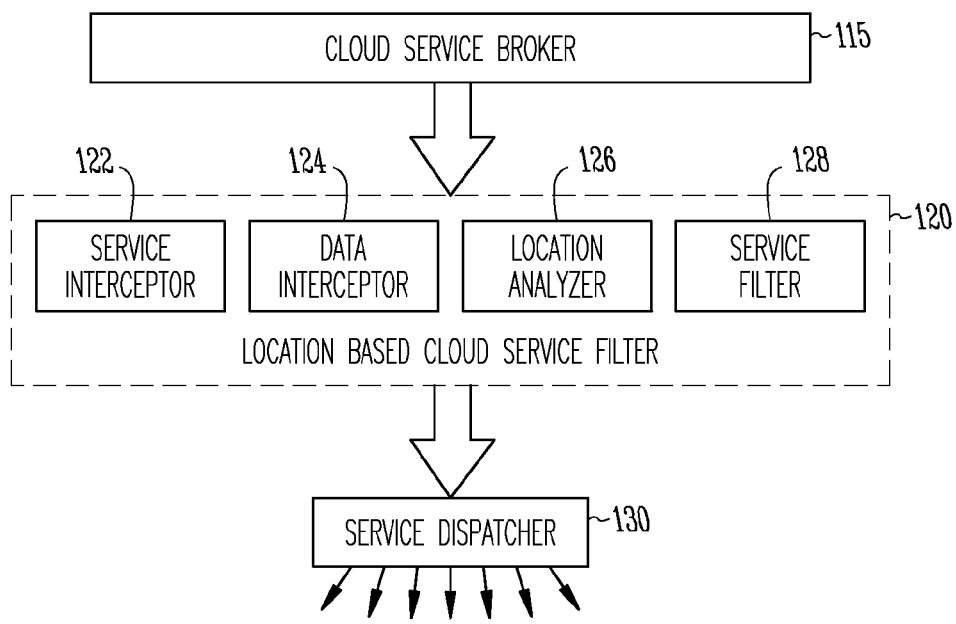
FIG. 2 is a block diagram of an example filter that can be used in connection with the example system of FIG. 1.

FIG. 2 illustrates the details of the location-based cloud service filter 120. The service filter 120 can be set up as a service to which customers can subscribe. Each subscriber can provide filtering parameters to the service filter such that the customer is presented only with cloud service providers that meet the criteria of the customer. The service filter could also be provided to a cloud service broker by a third party. As indicated in FIG. 2, the filter 120 includes a service interceptor 122, a data interceptor 124, a location analyzer 126, and a service filter 128. The output from this service filter is fed into a service dispatcher 130, which dispatches the selected service to the service consumer. More specifically, the service interceptor 122 intercepts network traffic for the service-based traffic and identifies the service and the location of the servers that are providing that service. The data interceptor 124 receives the data from the service interceptor 122, and further filters the data based on the endpoints and origination of the network routes for that data. The location analyzer 126 analyzes the location of data from the data interceptor 122. This analysis is based on the endpoints and origination endpoints and network hops of the data. The service filter 128, using the location analysis and service interceptor information, decides whether the information should be passed on to the recipient.

Figure 3:
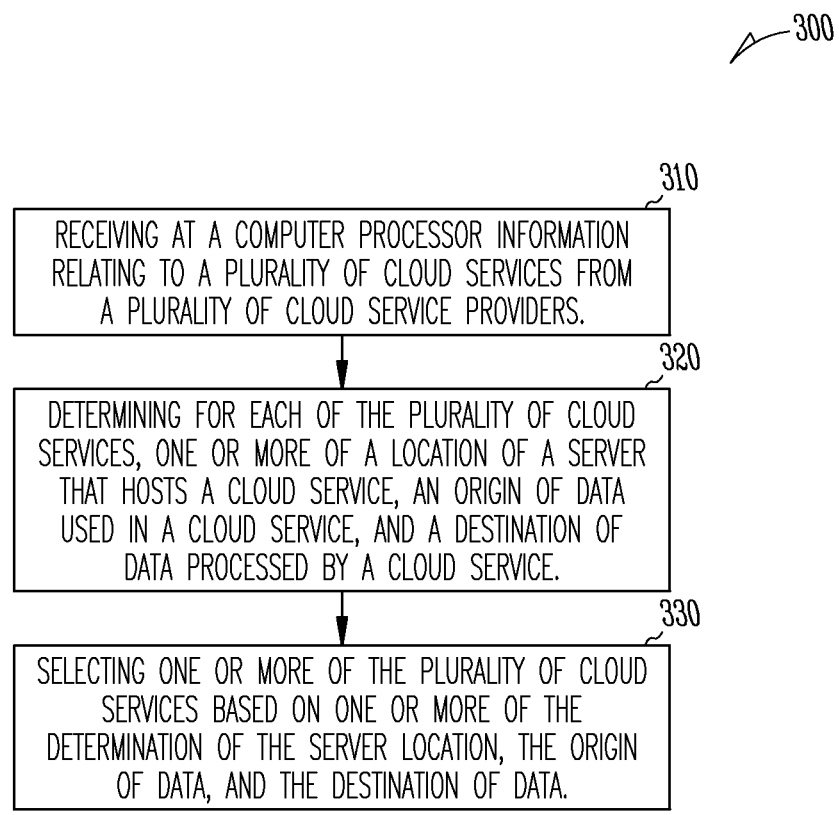
FIG. 3 is a high level flowchart of an example embodiment of a process to select a cloud service provider as a function of the geographic location of hardware and data.
Figure 4A:
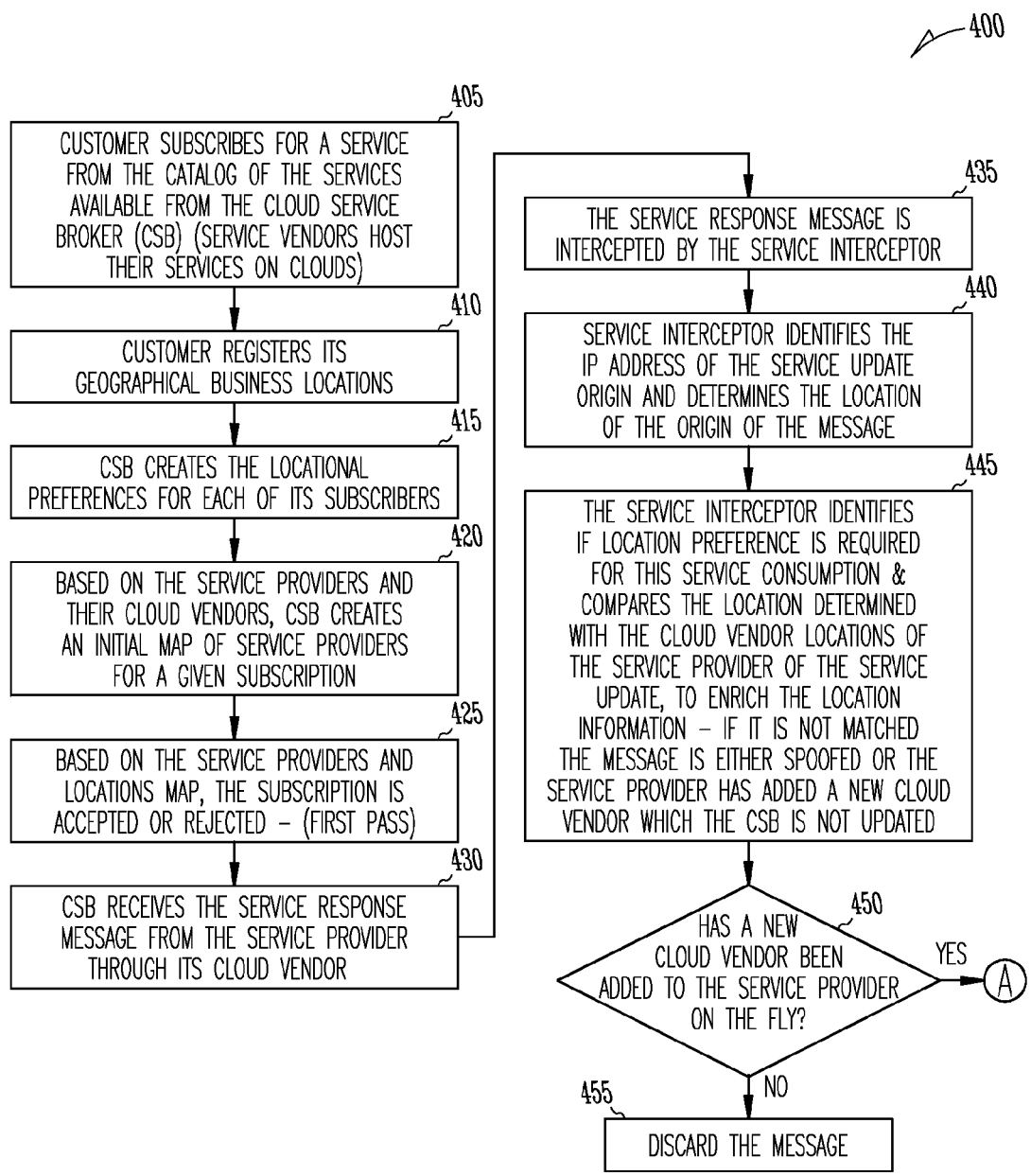
FIGS. 4A and 4B are a detailed flowchart of another example embodiment of a process to select a cloud service provider as a function of the geographic location of hardware and data.
Figure 4B:
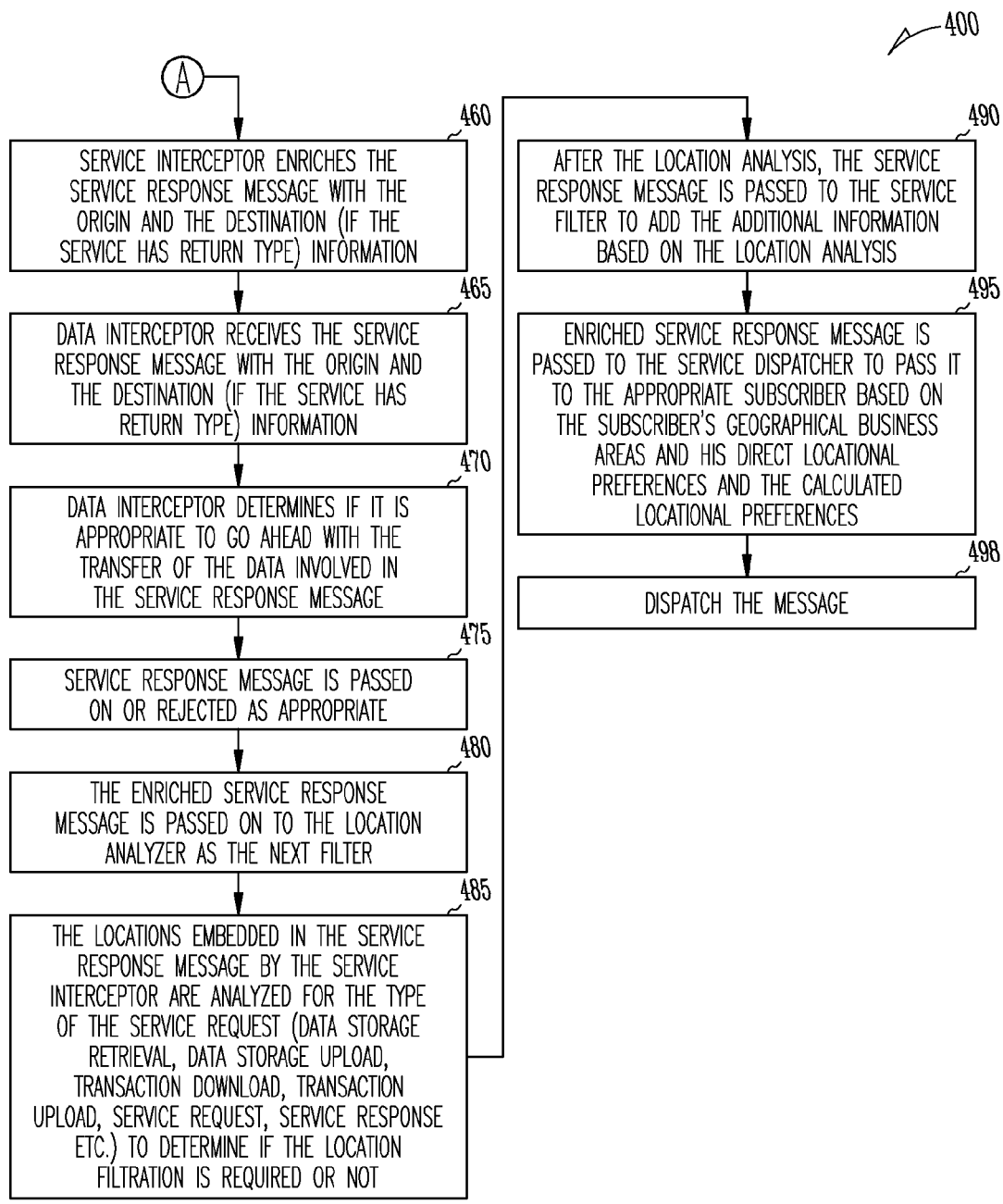

FIGS. 3, 4A, and 4B are flowcharts of example processes 300 and 400 for selecting cloud service providers based on location of servers and/or data. FIG. 3 includes a number of process blocks 310-330, and FIGS. 4A and 4B include a number of process blocks 405-498. Though arranged serially in the examples of FIGS. 3, 4A, and 4B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

FIG. 3 illustrates a process 300 to select a cloud service provider as a function of the geographic location of hardware and data. The process 300 includes at 310 receiving at a computer processor information relating to a plurality of cloud services from a plurality of cloud service providers. The computer processor is typically associated with a cloud service broker, such as cloud service broker 115 in FIG. 1. Cloud service vendors normally act as intermediaries between the service providers and the cloud service broker. At 320, the process 300 determines, for each of the plurality of cloud services, one or more of a location of a server that hosts the cloud service, an origin of data used in the cloud service, and a destination of data processed by the cloud service. At 330, the process 300 selects one or more of the plurality of cloud services based on one or more of the determination of the server location, the origin of data, and the destination of data. As discussed above, a subscriber may not want its data to be stored within the borders of a particular country, because of difficulty accessing that data, or concerns that the government of that country can access the data.

FIGS. 4A and 4B illustrate a more detailed process 400 to select a cloud service provider as a function of the geographic location of hardware and data and the geographic location preferences of a subscriber. In an embodiment, the process 400 can include all the steps 310-330 of process 300. Process 400 can further include, at 405, receiving from a subscriber a subscription request for a service. This normally involves service vendors who host their services on clouds, and the cloud service broker who maintains a catalog of services that are potentially available to the subscriber. The subscriber, at 410, registers its primary or main geographic business locations with the cloud service broker, and at 415, the cloud service broker uses this information to create location preferences for the subscriber. These location preferences can be based on the location preferences of the subscriber and/or the geographic business locations of the subscriber.

At 420, the cloud service broker creates an initial map of cloud service providers for the subscription request. The initial map contains all of the service providers that meet the geographic location requirements of a subscription request. The subscription request comprises one or more geographic business locations of the subscriber and one or more geographic location preferences of the subscriber. As noted previously, the geographic location preferences of the subscriber identify geographic locations at which the subscriber is willing to have the cloud service hosted, geographic locations from where the subscriber is willing to receive data, geographic locations to where the subscriber is willing to transfer data, and geographic locations at which the subscriber is willing to store data. At 425, the cloud service broker determines whether to initially accept or reject the subscription request as a function of the initial map. That is, the cloud service broker determines whether a particular service provider meets the geographic location preferences of a particular subscriber.

At 430, the cloud service broker receives a service response message from a service provider via that service provider's cloud vendor. This occurs after a subscriber requests a service from the cloud service broker, and the cloud service broker makes this request known to several service providers via their respective cloud vendors. The response of the service provider is the service response message. At 435, the service response message is intercepted by the service interceptor 122 of the cloud service filter 120, and at 440, the service interceptor 122 determines the Internet protocol (IP) addresses of the service response messages, geographic locations of each of the service providers' servers, and geographic locations relating to the origin, transfer, and storage of data used by each of the service providers. At 445, the geographic location preferences of the subscriber are compared with a geographic location of each of the service providers. At 445, it is additionally determined if a cloud vendor has added a new service provider, and if a cloud vendor has added a new service provider, a database is updated with the new service provider. Thereafter, at 450, the service interceptor 122 verifies if a new service provider has been added by the cloud vendor, and then determines whether to accept the service response message or discard the message at 455. In step 455, it is the subscriber-configured location preferences that are used to determine whether to accept or discard the message. However, at times the location information from the received message may not exactly match the preferences of the subscriber. In such a case, it is determined if the location of the IP address of the message matches with any of the new cloud vendor locations that were added by the cloud service broker. Collectively, these locations are compared with the subscriber preferences, and accepted if a match occurs or discarded if a match does not occur.

At 460, the service interceptor 122 enriches the service response message by adding origin and destination information to the service response message. In an embodiment, this is performed if the service has a return type. The service message is enriched because, in its raw format, it will contain only the IP address at the TCP level, which at the most might contain the destination and the origin. Therefore, the message should be enriched to include the identification of the service, the actual location based on the IP address, and the location mapped to the return address. It can be important to map the location to the return address because the subscriber will be responding to the request based on this return address. From the information that the cloud service broker has about the service vendors and the cloud vendors, the filter 120 will add more locations (origination and destination) for this service. It will also add an identifier so that it will be easy for the filter 120 to process the messages that originate back and forth for the same service being consumed. The response that the subscribers provide in terms of data and information should be filtered based on these locations. Consequently, the message can also be enriched with that information.

At 465, the service interceptor 122 sends the service response message to the data interceptor 124. As noted, the service response message contains origin and destination information. Like in process block 465, in an embodiment, this is performed if the service has a return type. At 470, the data interceptor 124 determines if it is appropriate to transfer the data associated with the service response message. This determination is based on the origin and destination information within the service response message. At 475, the service response message is passed on from the data interceptor 124, or the service response message is rejected. This acceptance or rejection is based once again on the origin and destination information in the service response message. If the service response message is passed on, it is received by the location analyzer 126 at 480. At 485, the location analyzer 126 analyzes the origin and destination information of the enriched message as a function of a type of service request. Examples of service type requests include data storage retrieval, data storage upload, transaction download, transaction upload, service request, and a service response. For example, a subscriber may not be concerned with from where data is downloaded, but the subscriber may be concerned with to where the data is uploaded. Further at 485, the location analyzer 126 determines if location filtration is required as a function of the embedded locations in the enriched message and the type of service request. At 490, the service response message is passed from the location analyzer 126 to the service filter 128. The service filter 128 can add additional information based on the location analysis. This additional information includes the enriched information and whether location filtration is required for this message related to this service. At 495, the enriched service response message is passed to the service dispatcher 130 to pass it onto the appropriate subscriber based on the subscriber's geographical business areas, the subscriber's location preferences, and calculated location preferences. The calculated location preferences are preferences that are derived from the rules of the filter 120. For example, if the subscriber opts for the data to be stored in certain locations, the system can determine, based on the rules within the filter 120, additional locations that the user may want to consider. For example, if the subscriber is agreeable to having his data stored in the United States, he also might be agreeable to having the data stored in Canada as well. Another set of calculated locations are the ones that the system discovers if any new vendors are added that provide services in which the subscriber is interested.

Figure 5:
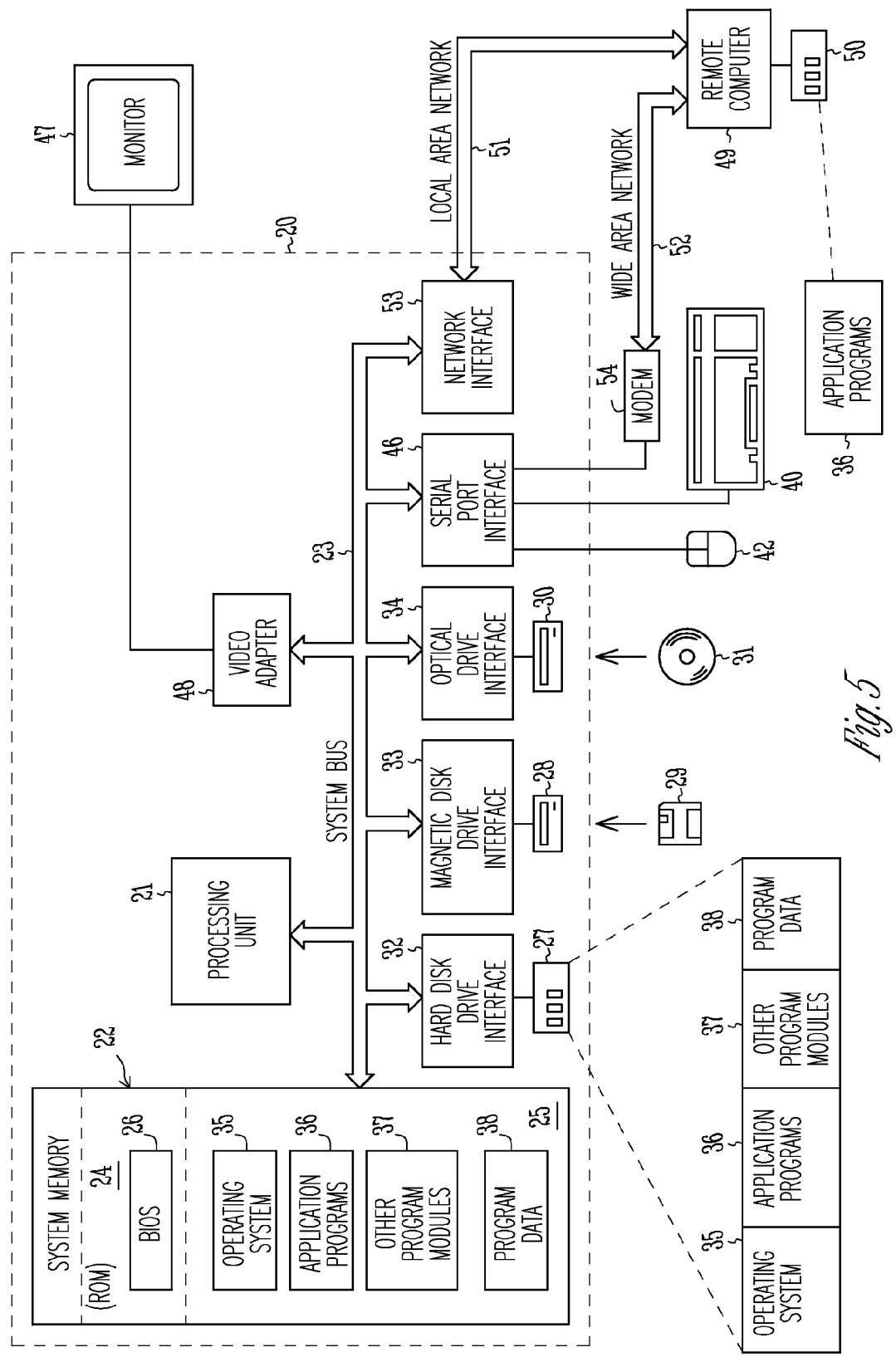
FIG. 5 is a block diagram of a computer system in connection with which one or more embodiments of the present disclosure may operate.

FIG. 5 is an overview diagram of a hardware and operating environment in conjunction with which embodiments of the invention may be practiced. The description of FIG. 5 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 5, a hardware and operating environment is provided that is applicable to any of the servers and/or remote clients shown in the other Figures.

As shown in FIG. 5, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 5 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Example Embodiments

In Example No. 1, a process includes receiving, at a computer processor, information relating to a plurality of cloud services from a plurality of cloud service providers; determining, using the computer processor, for each of the plurality of cloud services, one or more of a location of a server that hosts a cloud service, an origin of data used in the cloud service, and a destination of data processed by the cloud service; and selecting, with the computer processor, one or more of the plurality of cloud services based on one or more of the determination of the server location, the origin of data, and the destination of data.

In Example No. 2, a process includes the features of Example No. 1, and further optionally includes a feature wherein the computer processor is associated with a cloud services broker; wherein the cloud services broker is in communication with one or more subscribers and one or more cloud vendors; and wherein the cloud vendors are in communication with one or more service providers.

In Example No. 3, a process includes the features of Example Nos. 1-2, and further optionally includes receiving, at the computer processor, from a subscriber, a subscription request for a service; and creating, using the computer processor, an initial map of cloud service providers for the subscription request. The subscription request includes one or more geographic locations of the subscriber and one or more geographic location preferences of the subscriber.

In Example No. 4, a process includes the features of Example Nos. 1-3, and further optionally includes a feature wherein the geographic location preferences of the subscriber identify geographic locations at which the subscriber is willing to have the cloud service hosted, geographic locations from where the subscriber is willing to receive data, geographic locations to where the subscriber is willing to transfer data, and geographic locations at which the subscriber is willing to store data.

In Example No. 5, a process includes the features of Example Nos. 1-4, and further optionally includes using the computer processor to initially accept or reject the subscription request as a function of the initial map.

In Example No. 6, a process includes the features of Example Nos. 1-5, and further optionally includes receiving at the computer processor one or more service response messages from one or more of the plurality of cloud service providers.

In Example No. 7, a process includes the features of Example Nos. 1-6, and further optionally includes determining, using the computer processor, Internet Protocol (IP) addresses of the one or more service response messages, geographic locations of each of the one or more service provider's servers, and geographic locations relating to the origin, transfer, and storage of date used by each of the one or more service providers.

In Example No. 8, a process includes the features of Example Nos. 1-7, and further optionally includes comparing geographical location preferences of the subscriber with a geographic location of each of the service providers.

In Example No. 9, a process includes the features of Example Nos. 1-8, and further optionally includes determining if a cloud vendor has added a new service provider, and updating a computer storage medium associated with the computer processor with the new service provider.

In Example No. 10, a process includes the features of Example Nos. 1-9, and further optionally includes enriching the service response message by adding origin and destination information to the service response message.

In Example No. 11, a process includes the features of Example Nos. 1-10, and further optionally includes determining whether to transfer data associated with the service response message as a function of the origin and destination information.

In Example No. 12, a process includes the features of Example Nos. 1-11, and further optionally includes analyzing the origin and destination information of the enriched message as a function of a type of service request, wherein the type of service request comprises one or more of data storage retrieval, data storage upload, transaction download, transaction upload, service request, and a service response; and determining if location filtration is required as a function of embedded locations in the enriched message and the type of service request.

In Example No. 13, a process includes the features of Example Nos. 1-12, and further optionally includes transmitting the service response message to the subscriber as a function of the subscriber's geographical business location, the subscriber's geographic location preferences, and the calculated location preferences.

In Example No. 14, a system includes a broker computer processor configured to receive a plurality of cloud services from a plurality of cloud service providers; a filter computer processor, coupled to the broker computer processor, configured to filter the plurality of services from the plurality of cloud service providers, wherein the filtering is a function of one or more of a location of a server that hosts a cloud service, an origin of data used in the cloud service, and a destination of data processed by the cloud service; and a dispatch computer processor, coupled to the filter computer processor, configured to dispatch to a subscriber one or more cloud services as a function of the filtering of the filter computer processor.

In Example No. 15, a system includes the features of Example No. 14, and further optionally includes a feature wherein the filter computer processor comprises a service interceptor processor, and the service interceptor processor is configured to analyze the plurality of cloud services and identify the types of services among the plurality of cloud services.

In Example No. 16, a system includes the features of Example Nos. 14-15, and further optionally includes a feature wherein the filter computer processor comprises a data interceptor processor, and the data interceptor processor is configured to analyze and determine origination points and endpoints in a network route of a cloud service.

In Example No. 17, a system includes the features of Example Nos. 14-16, and further optionally includes a feature wherein the filter computer processor comprises a location analyzer processor, and the location analyzer processor is configured to identify server locations and data locations based on the origination points and end points in the network route.

In Example No. 18, a system includes the features of Example Nos. 14-17, and further optionally includes one or more cloud vendor processors, wherein the cloud vendor processors are configured to provide a plurality of service providers to the broker computer processor.

In Example No. 19, a tangible computer readable storage medium includes instructions that when executed by a processor execute a process including receiving, at a computer processor, information relating to a plurality of cloud services from a plurality of cloud service providers; determining, using the computer processor, for each of the plurality of cloud services, one or more of a location of a server that hosts a cloud service, an origin of data used in the cloud service, and a destination of data processed by the cloud service; and selecting, with the computer processor, one or more of the plurality of cloud services based on one or more of the determination of the server location, the origin of data, and the destination of data.

In Example No. 20, a tangible computer readable storage medium includes the instructions of Example No. 10, and further optionally includes instructions for receiving, at the computer processor, from a subscriber, a subscription request for a service; and creating, using the computer processor, an initial map of cloud service providers for the subscription request. The subscription request comprises one or more geographic locations of the subscriber and one or more geographic location preferences of the subscriber, and the geographic location preferences of the subscriber identify geographic locations at which the subscriber is willing to have the cloud service hosted, geographic locations from where the subscriber is willing to receive data, geographic locations to where the subscriber is willing to transfer data, and geographic locations at which the subscriber is willing to store data.

Thus, an example system, method and machine readable medium for selecting cloud services have been described. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Embodiments of the invention further include features, methods or processes embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)). Consequently, a machine-readable medium can be either tangible or intangible in nature.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system for allocating cloud services to cloud service consumers, said system comprising:
   a broker computer processor configured to,
      catalog a plurality of cloud services from a plurality of cloud service providers;
      receive and process service requests from one or more cloud service consumers, wherein the service requests include location-based parameters; and
      for each service request,
         generate a map of said cloud service providers that meet geographic requirements specified by the location-based parameters;
         determine whether to initially accept or reject the service request as a function of the map; and
         communicate the service request to one or more of the plurality of cloud service providers;
   a filter computer processor coupled to the broker computer processor and configured to filter the plurality of cloud services to respective cloud service consumers, wherein based on the location-based parameters, the filtering is a function of a location of a server that hosts a cloud service, an origin of data used in the cloud service, and a destination of data processed by the cloud service, said filtering including,
      intercepting service response messages generated by the cloud service providers in response to service requests received from the broker computer processor;
      determining geographic locations of cloud service provider servers and of data origin and data destination endpoints from the service response messages;
      comparing the determined geographic locations with the location-based parameters; and
      for each of the service response messages, determining whether to discard the service response message based on said comparing; and
   a dispatch computer processor coupled to the filter computer processor, wherein the dispatch computer processor is configured to dispatch to a cloud service consumer one or more cloud services as a function of the broker computer processor and the filter computer processor.

2. The system of claim 1, wherein the filter computer processor comprises a service interceptor processor, the service interceptor processor configured to analyze the plurality of cloud services and identify types of services among the plurality of cloud services, and wherein the origin and destination of data includes geographic locations of endpoints, origination endpoints, and network hops of the data.

3. The system of claim 1, wherein the filter computer processor comprises a data interceptor processor, the data interceptor processor configured to analyze and determine origination points and endpoints in a network route of a cloud service.

4. The system of claim 3, wherein the filter computer processor comprises a location analyzer processor, the location analyzer processor configured to identify server locations and data locations based on the origination points and end points in the network route.

5. The system of claim 1, further comprising one or more cloud vendor processors, the cloud vendor processors configured to provide a plurality of service providers to the broker computer processor.

\* \* \* \* \*